US009710652B1

(12) United States Patent
Condra et al.

(10) Patent No.: US 9,710,652 B1
(45) Date of Patent: *Jul. 18, 2017

(54) VERIFYING BOOT PROCESS OF ELECTRONIC DEVICE

(71) Applicant: Google Inc., Mountain View, CA (US)

(72) Inventors: Curtis Gerald Condra, Santa Clara, CA (US); Adrian Ludwig, San Francisco, CA (US); Colin Cross, Sunnyvale, CA (US); Kenneth Root, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/946,863

(22) Filed: Nov. 20, 2015

Related U.S. Application Data

(63) Continuation of application No. 14/268,486, filed on May 2, 2014, now Pat. No. 9,195,831.

(51) Int. Cl.
*G06F 15/177* (2006.01)
*G06F 21/57* (2013.01)

(52) U.S. Cl.
CPC ...... *G06F 21/575* (2013.01); *G06F 2221/034* (2013.01)

(58) Field of Classification Search
CPC ........... H04L 29/06; G06F 21/57; G06F 11/14
USPC ............................................................. 713/2
See application file for complete search history.

(56) References Cited

U.S. PATENT DOCUMENTS

| | | |
|---|---|---|
| 5,826,015 A | 10/1998 | Schmidt |
| 6,477,648 B1 | 11/2002 | Schell et al. |
| 6,625,730 B1 | 9/2003 | Angelo et al. |
| 6,907,522 B2 | 6/2005 | Morais et al. |
| 8,443,203 B2 | 5/2013 | Park et al. |
| 8,560,820 B2 | 10/2013 | De Cesare et al. |
| 9,195,831 B1 * | 11/2015 | Condra ............... G06F 11/1417 |
| 2003/0014663 A1 | 1/2003 | Sormunen et al. |
| 2005/0257050 A1 | 11/2005 | Gierens et al. |
| 2006/0005034 A1 | 1/2006 | Willman et al. |

(Continued)

FOREIGN PATENT DOCUMENTS

EP       1273996 B1      8/2008

OTHER PUBLICATIONS

Notification of Transmittal of the International Search Report and The Written Opinion of the International Search Authority, or the Declaration.

(Continued)

*Primary Examiner* — Vincent Tran

(74) *Attorney, Agent, or Firm* — Morris & Kamlay LLP

(57) ABSTRACT

A user-provided keystore may be utilized in a boot process to verify a boot image as disclosed herein. A device may be determined to be in a locked or verified state. A selected keystore may be determined to not verify against a first key such as a root key. A user may provide a keystore to a device. The system may display a prompt to the user which asks whether the user would like to continue to boot or not, if the system determines that the keystore does not verify against the first key. The user may respond to the prompt by indicating a desire to continue booting. The system may determine that the boot image verifies against the keystore and finish booting the device. Thus, the prompt may alert the user to a threat to the integrity of the boot process or device.

20 Claims, 5 Drawing Sheets

(56) References Cited

U.S. PATENT DOCUMENTS

| | | |
|---|---|---|
| 2006/0020780 A1 | 1/2006 | Hobson |
| 2006/0053277 A1 | 3/2006 | Wang et al. |
| 2007/0067617 A1 | 3/2007 | Tarkkala et al. |
| 2007/0130452 A1 | 6/2007 | Muir et al. |
| 2009/0106587 A1 | 4/2009 | Mambakkam et al. |
| 2011/0087872 A1* | 4/2011 | Shah ................. G06F 21/74 713/2 |
| 2011/0261964 A1 | 10/2011 | Kahler et al. |
| 2011/0302638 A1 | 12/2011 | Cha et al. |
| 2012/0042376 A1 | 2/2012 | Dolgunov et al. |
| 2012/0166781 A1* | 6/2012 | de Cesare ........... G06F 21/575 713/1 |
| 2014/0025939 A1 | 1/2014 | Smith et al. |
| 2014/0181498 A1* | 6/2014 | Rhee ................. G06F 21/57 713/2 |
| 2014/0317417 A1* | 10/2014 | Ashkenazi .......... H04L 9/0866 713/189 |
| 2014/0380425 A1* | 12/2014 | Lockett ............... H04L 63/20 726/4 |
| 2015/0058979 A1 | 2/2015 | Peeters et al. |

OTHER PUBLICATIONS

"Anonymous: Developer Mode—The Chromium Projects", URL:http://www.chromium.org/chromium-os/charmiumos-design-docs/developer-mode, May 1, 2014, 11 pages.

Corbet, "dm-verity", URL:https://lwn.net/Articles/459420/, Sep. 19, 2011, 7 pages.

International Preliminary Report on Patentability dated Nov. 17, 2016 as received in Application No. PCT /US2015/028151.

* cited by examiner

VERIFYING BOOT PROCESS OF ELECTRONIC DEVICE

BACKGROUND

Modern computing devices, particularly those based on x86 or ARM architecture, have a boot process that occurs from when the power button is pressed to turn on the device until the device shows a conventional operating system or other runtime environment. Turning the power on may activate the processor. The processor may read an instruction set from ROM on the device. The instruction set may contain code or instructions for a boot loader to be activated and/or its instructions loaded into RAM. A boot loader, which may refer to a program designed to execute or operate before the operating system. It may be responsible for placing code or instructions for the operating system into RAM. The instructions for the boot loader may be a component of firmware that is provided by the original equipment manufacturer ("OEM") that made the computing device or it may be a component of a boot image. The OEM provided firmware cannot be altered (e.g., written to or deleted) by a subsequent user and is typically stored in ROM. The boot loader may be specific to the hardware of the computing device. The boot loader may be responsible for initializing the kernel, services, and core libraries from the boot image that are required by the operating system or runtime environment. Initialization or activation of the kernel, root processes, services, core libraries, etc. as performed by the boot loader may occur in phases that are part of the boot process. That is, the kernel may be initialized in a first phase and root processes may be initialized in a subsequent phase of the boot process.

BRIEF SUMMARY

According to an implementation of the disclosed subject matter, a device may be determined to be in at least one of a locked or verified state. A selected keystore may be determined to not verify against a first key. A pompt may be provided that asks whether the device may continue to boot or not boot. A response to the prompt may be received that instructs the device to continue to boot. A boot image may be determined to verify against the keystore and boot of the device may be finished.

A device is disclosed that includes a computer readable medium, a display, and a processor. The computer readable medium may be configured to store at least one of the first key and the keystore. The display may be configured to show a prompt. The processor may be configured to determine the device is in at least one of a locked or verified state. The processor may determine a selected keystore does not verify against a first key stored in the computer readable medium and provide the prompt that asks whether the device may continue to boot or not boot based on that determination. The processor may receive a response to the prompt instructing the device to continue to boot. It may be configured to determine a boot image verifies against the keystore and finish boot of the device.

In an implementation, a system according to the presently disclosed subject matter includes a means for determining a device is in at least one of a locked or verified state and determining a selected keystore does not verify against a first key. Responsive to determining the selected keystore does not verify against the first key, the system may include a means for providing a prompt that asks whether the device may continue to boot or not boot. The system may include a means for receiving a response to the prompt instructing the device to continue to boot and determining that a boot image verifies against the keystore. The system may include a means for finishing boot of the device.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

During a boot process, a verification process may be employed to ensure that the device has not been subjected to a root kit or other malware-based attack that could expose a user's personal information or identity to an attacker. A computing device may build a chain of trust beginning from when the boot loader first initializes (e.g., the processor reads the boot loader's code from ROM or otherwise executed or operational) until the operating system or runtime environment is fully loaded an operational on the computing system. A chain of trust can be established in different ways depending on the type of threat the maker of the device is concerned with. For example, an operating system may require bit for bit matching throughout the boot process and forbid a user from modifying any component of the boot process. Such an operating system is primarily concerned with a software-based attack, not a hardware attack because a would-be attacker cannot access the firmware of the hardware in this model. As another example, a computing device may include a Trusted Platform Module ("TPM") which includes a processor that generates cryptographic keys for various hardware components to secure the hardware an attack. The TPM may be combined with a boot loader verification process such as a chain of trust that utilizes OEM-provided keys to sign and/or verify each phase of the boot process.

A key may be provided from an OEM and stored on ROM or other suitable computer readable medium. The key may be a component of firmware provided from the OEM and it cannot be changed. This key may form a root of trust for the device. It may be utilized to verify a subsequent stage of the boot process. The subsequent stage may have its own key that can be utilized to verify another subsequent stage. This process may be repeated until the operating system or runtime environment is fully loaded.

Figure 3:
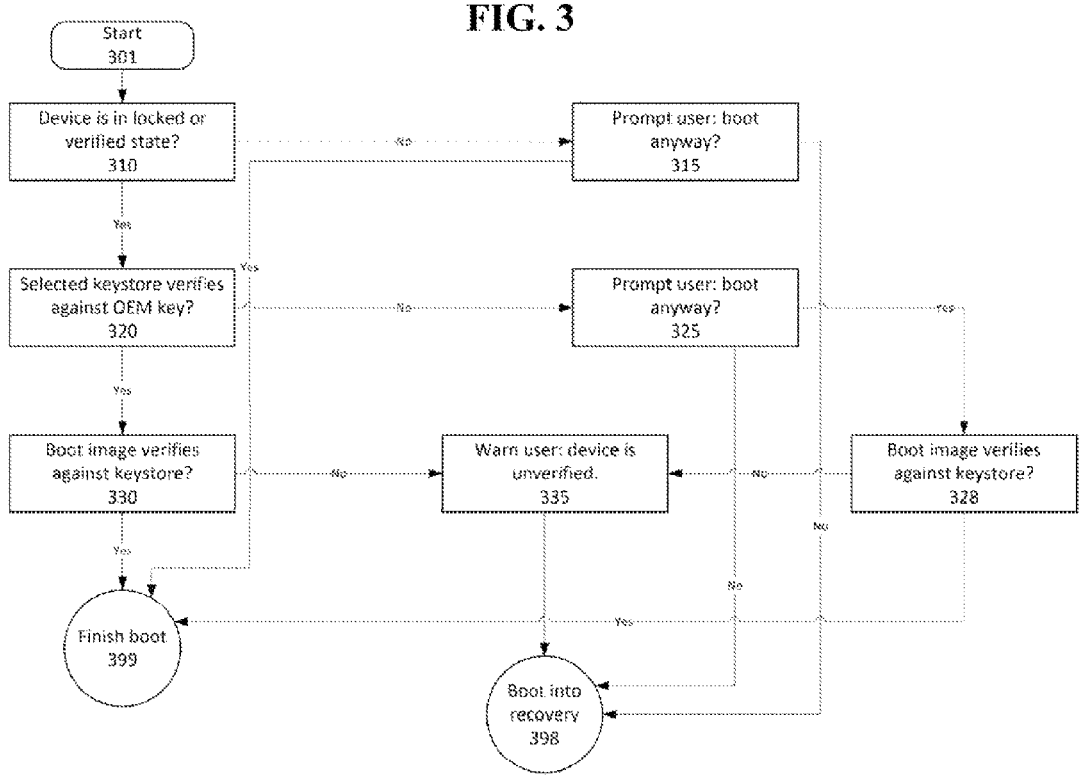
FIG. 3 is an example overview of the boot process according to an implementation disclosed herein.

For most users, the process of building a secure boot chain (e.g., where one phase is verified by the previous phase) will be based on the OEM provided keystore and will build a chain of trust until the computing device is in the runtime environment that the OEM would like the user to be in. FIG. 3 shows an example overview of the boot process as. The computing device may begin at 301, by the processor reading the boot loader's code from ROM. The system may determine if the computing device is in a locked or verified state at 310. The different states of a device—locked, unlocked, and verified—will be described below. Most computing devices are in a locked or verified state from the factory. Thus, the system will proceed to determine whether the selected keystore verifies against an OEM key at 320. If the computing device has not been tampered with, the selected keystore will be that which is provided by the OEM. For example, a hash of the keystore may be compared to a hash of the root key stored in ROM on the device. If the keystore verifies against the root key, the system will proceed to determine whether the boot image verifies against the keystore at 330. The keystore may contain one or more keys that are provided from an OEM, for example. A key in the keystore may be different from the root key. A boot image may be stored on a partition of computer readable medium on a computing device. It may allow hardware associated with the computing device to complete a boot process. The boot image may contain an operating system, core libraries, and other boot data. User data may be stored in a separate partition on the computer readable medium from the boot image.

A hash of the boot image may be compared to the one or more keys in the keystore. If the keystore and boot image hash match, then the computing device may continue to boot into a runtime environment at 399. If, however, the keystore and the boot image do not match, the computing device may warn the user that the device is unverified at 335 and boot into a recovery mode at 398. The instructions for the recovery mode may be stored on a separate partition of the computing device and the recover partition may be verified according to, for example, the processes shown in FIG. 3. The recovery mode may limit what action can be taken by a user and may not load one or more core libraries, services, etc. for the operating system or runtime environment. For example, recovery mode may allow a user to perform a factory reset of the device, wipe (i.e., erase or overwrite) a cache partition, apply an update to the device, etc. The process shown at 301, 310, 320, 330, and 399 represents the typical process a computing device (e.g., a smartphone) will undergo if it has not been altered from the factory. While in the recovery mode, the system may not be able to access the user data partition or copy the user partition to another device or external storage. The recovery mode may not utilize some or all of the services and/or core libraries for the operating system or runtime environment.

As stated above, a device may exist in one of three states: locked, unlocked, or verified. A device is typically shipped from an OEM with a locked boot loader. In some instances, the boot loader may be encrypted. A locked state may refer to an instance where the boot loader cannot be altered by a user. A user may have confidence that a device in a locked state will provide a user-experience produced by the OEM both with respect to the boot process and the operating system or runtime environment. The device cannot be flashed, for example with a custom ROM, in the locked state. A verified state indicates that a user in physical control of the device may perform limited actions intended to change the state of the device, but may not break its current chain of trust. Such a user may not alter the root key, the OEM keystore, and/or a user keystore. In the verified state, however, a user may be able to flash (e.g., overwrite) one or more partitions (e.g., the boot loader partition, a boot partition, a system partition, a vendor partition, and/or the recovery partition) and/or erase a partition containing user data and/or a cache. An unlocked state is the opposite of a locked state and may contain a custom ROM or boot image that is not provided or verified by the OEM. If a device is in an unlocked state, it may have verification of the boot loader disabled. The device may be freely flashed with a custom image and may not be intended to be verified. For example, in FIG. 3, at step 310, an unlocked device would not be in a locked or verified state and a prompt would appear asking the user whether to continue with the boot process 399 or not (i.e., boot into recover mode) 398.

Figure 4:
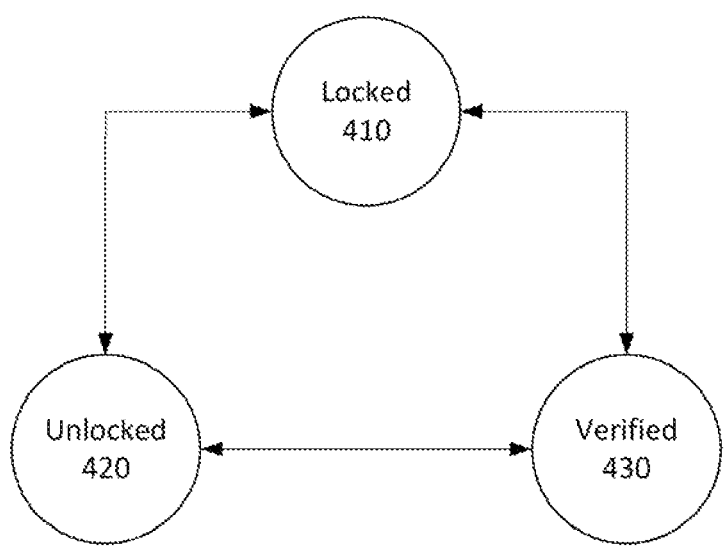
FIG. 4 is an example of how a computer device may change its state between locked, unlocked, and verified as disclosed herein.

FIG. 4 shows an example of the three states that may exist for a computing device, locked 410, unlocked 420, and verified 430. The device state may be changed between the three states. All state transitions require a data wipe of the partition containing the user's data. A data wipe may refer to erasing data and/or overwriting some or all of a portion of data. This may ensure that a user's data could not be obtained by moving the device between states. For example, a hostile user may obtain a smartphone of a user and the smartphone is in the locked or verified state. The hostile user may not flash a hostile system image, thereby allowing the user to gain access to the user's data (e.g., movies, pictures, text messages, email, etc.) without wiping the user's data partition. If the hostile user was not required to wipe the user data partition, the hostile user, after changing permissions on the user's data, could again transition the device to a locked or verified state while maintaining the changed file permissions. Thus, it is desirable to require a data wipe any time a transition from one device state to another device state is requested. Having the ability to change device states may be useful for software developers or individuals who would like to customize the computing device.

As disclosed herein, a user-replaceable keystore may be utilized to build a chain of trust. The user may build a chain of trust based on the user-provided keystore. The boot loader may prompt the user to alert the user that the keystore has been altered or replaced with the user-provided keystore. The prompt may ask the user if the user would like to continue to the boot process with the user-provided keystore. Returning to FIG. 3, at step 320, if the user has replaced the keystore, then the user-provided keystore would not verify against the root or OEM key. The system may display a prompt to the user at 325. The prompt may alert the user that the selected keystore (e.g., the user-provided keystore) does not verify against the root key. The prompt may ask whether the user would like to continue the boot process or not. If the user elects to not to continue, the system may boot the device into the recovery mode at 398. If the user elects to complete the boot process, the system may attempt to verify the boot image against the user-provided keystore at 328. The system may treat an affirmative response at 325 as the user making an out-of-band verification of the user-provided keystore. The user may continue to boot and verify the boot image against the user-provided keystore. For example, a developer may still obtain a chain of trust from the OEM as well as from the developer herself. If the developer, therefore, flashed a custom ROM onto the device, the developer may verify that custom ROM against the developer-provided keystore and the OEM components of the boot loader and/or custom ROM (e.g., a software program or service incorporated with the custom ROM or later added to the custom ROM) may be verified against the OEM keystore or key. In some instances, an OEM keystore and a user-provided keystore may be combined into a single keystore. That is, the combined keystore may contain multiple keys, at least one of which corresponds to an OEM-provided key and at least one of which corresponds to a user-provided key. If the boot image does not contain a match for a key in the keystore, then the system may warn the user that the device is unverified at 335 and boot into the recovery mode at 398. If the boot image does contain a match for a key in the keystore, then the system may continue the boot process of the device at 399.

Figure 5:
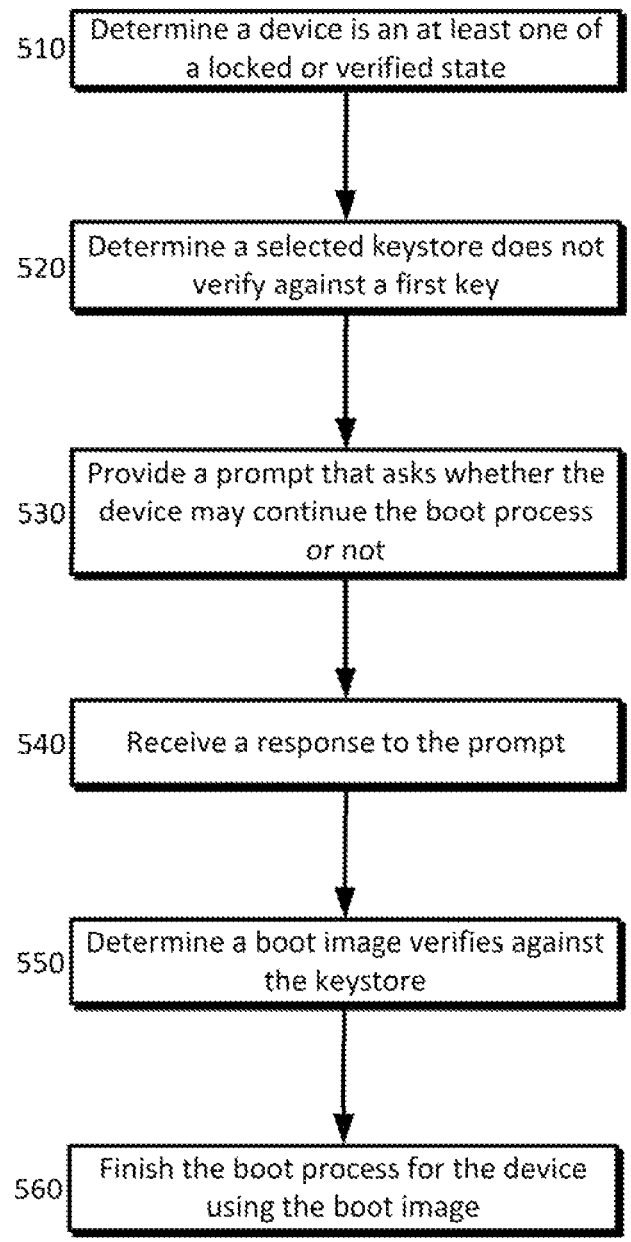
FIG. 5 is an example process that may allow a user to verify a boot image against a user-provided keystore as disclosed herein.

An example process that may allow a user to verify a boot image against a user-provided keystore as disclosed herein is shown in FIG. 5. A device may be determined to be in a locked or verified state at 510. For example, it may be determined that the permissions regarding one or more partitions on the device (e.g., the boot partition, recovery partition, etc.) has not been altered to allow the partition to be overwritten by a user. The device may determine that only a user with root permission has the ability to write to one or more partitions. The determination at 510 may be performed upon initiation of a boot process which may refer to a time from when a computing device is activated, such as pressing the power button on a smartphone, until an operating system or runtime environment is capable of receiving user interactions.

A selected keystore may be determined to not verify against a first key at 520 during the boot process. A keystore may include one or more keys that may be utilized to verify a boot image (e.g., a custom ROM). As described above, a user may provide a keystore to a device. For example, a developer (e.g., a user) may desire to install a custom ROM on a smartphone. The custom ROM may be a boot or system image. The custom ROM may include a keystore (as a separate component or incorporated therewith) or add one or more keys to the existing keystore at the user's request and/or acceptance. The first key may be a root key or OEM key. The first key may be an alphanumeric code that is known only to the computing device on which it is stored. For example, the computing device may read the first key as a part of a process to verify a keystore. The OEM boot image may be the only image that verifies against an original or OEM keystore, which in turn may verify against the root key. If the system determines that the selected keystore does not verify against the first key, the system may display a prompt to the user which asks whether the user would like to continue the boot process or not at 530. The user may respond to the prompt by providing an indication that the user would like to deny the system the ability to continue the boot process, which may cause the system to enter the recovery mode. For example, the user may not have installed a custom keystore or recently attempted to install a custom boot image. Thus, the prompt may alert the user that an attempt to subvert the user's control of the device or other similar attack may be underway. The user may respond to the prompt at 530 by indicating a desire to continue the boot process. In such a case, the system may continue the boot process at 540. The user's acceptance of the selected keystore may enable the user to receive guarantees about the authenticity of the system and services provided thereafter if such system and services verify against the selected keystore, which now may include a user-provided (i.e., selected) keystore. The system may determine that the boot image verifies against the selected keystore at 550. For example, if the user is attempting to install a custom ROM on the user's smartphone, the system may compare a key or hash of the custom ROM to a key in the selected keystore. If a match exists, then the system may finish the boot process of the device using the boot image at 560. The system may, for example, load services and/or core libraries that enable the operating system or runtime environment to be used and/or interacted with by an end user.

The first key may be stored on a computer readable medium that cannot be modified. For example, the OEM, as described earlier, may provide a root key which may be the basis for the first phase of verification of a boot process. As disclosed herein, failure to match the first key may not be fatal to the boot process if the user agrees to continue the boot process (See, for example, step 530). Once the computer readable medium has been written with the first key, the computer readable medium may not be overwritten or accessed. A device, such as a smartphone, may have computer readable medium as ROM (or other suitable medium) and it may contain a second computer readable medium on which a boot image exists. The boot image or system image may be provided by the OEM. It may provide a user of the device with the operating environment that the OEM intended. The boot image may exist on a partition of the second computer readable medium. Other partitions, such as the recovery partition, the user data partition, the boot partition, etc. may also exist on the second computer readable medium.

As described earlier, to ensure that a hostile image cannot be utilized to obtain access to the end user's personal data, the system may require wiping of the user partition of the device any time a new boot image is desired to be used on the device. Subsequent to wiping the user partition, a new image may be flashed to the device and the selected keystore may be determined to verify against the first key. The boot image may include an original keystore. The original keystore may be, for example, the keystore that originally came with the device and it may verify against the key. Similarly, the new boot image may be a factory or OEM boot image and it may verify against the keystore (see, for example, FIG. 3, step 330) and the device may finish the boot process for the device. In some instances, the new boot image may not verify against the original keystore and the device or system may provide a warning that indicates the device is unverified. This may occur if the boot image the user flashed contained malware, for example, and the inclusion of the malware made the hash for the boot image dissimilar to the one stored in the keystore. The device may boot into recovery mode if the boot image cannot be verified to prevent the device from loading an unverified image. The new boot image may be a custom boot image (e.g., one not made by an OEM) as well.

Figure 6:
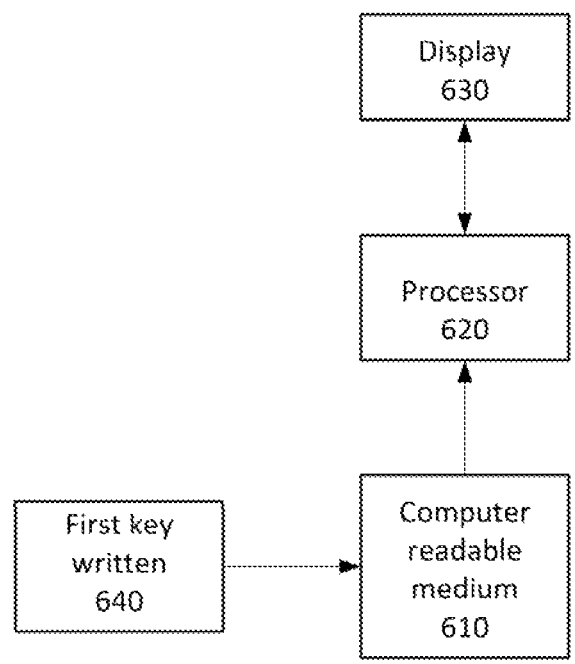
FIG. 6 is an example of a device that may allow a user to verify a boot image against a user-provided keystore as disclosed herein.

In an implementation, an example of which is provided in FIG. 6, a device is disclosed. The device, for which a portion of the components are shown in FIG. 6, may include a computer readable medium 610, a display 630, and a processor 620. The computer readable medium may store at least one of the first key and a selected keystore as described earlier. The first key may have been written 640 to the computer readable medium 610 when the device was manufactured. The first key may be an OEM-provided key or a root key. The computer readable medium 610 may not be accessible after the boot process in some configurations. The selected keystore may be the OEM keystore (i.e., the device manufacturer's provided keystore) or a custom or user-provided keystore. The display 630 and the processor 620 may be activated, not necessarily simultaneously, subsequent to a power button (or other mechanism for turning on the device) being pressed or activated on the device. The display 630 may be configured to show a prompt at one or more phases of the boot process, for example. The processor 620 may be configured to determine that the device is in at least one of a locked or verified state as described earlier upon initiation of a boot process as described earlier. It may determine that a selected keystore (e.g., an OEM keystore and/or a user-provided keystore) does not verify against the first key which may be stored in the computer readable medium during the boot process for the device. The processor 620 may instruct the display 630 to show a prompt which asks whether the device may continue the boot process or not as described above. The response may be received by the processor 620, for example by a touch input on the display, a keyboard input, or a peripheral device (e.g., a mouse) input. The processor 620 may receive a response to the prompt that directs the device to continue the boot process. The processor 620 may determine a boot image verifies against the keystore finish the boot process for the device using the boot image.

Figure 1:
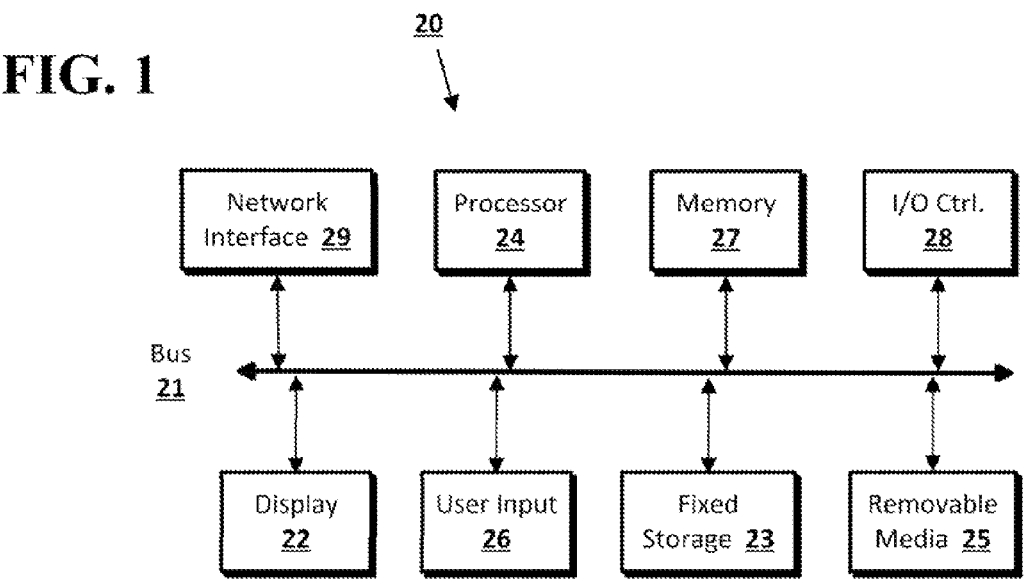
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
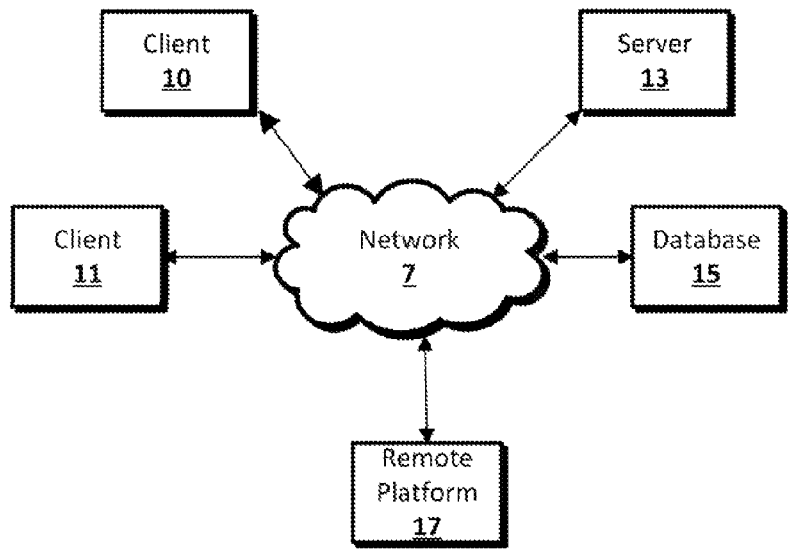
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A device, comprising:
 a computer readable medium configured to store a keystore, a boot image, and a key, the key known only to the device; and
 a processor configured to:
  determine, in response to initiation of a boot process, that the device is in a locked state or a verified state;
  determine that the keystore fails to verify against the key;
  determine, in response to a determination that the keystore fails to verify against the key, that the boot image verifies against the keystore; and
  finish the boot process in response to a determination that the boot image verifies against the keystore.

2. The device of claim 1, wherein the locked state is a state in which a boot loader of the device cannot be altered by a user of the device.

3. The device of claim 1, wherein the verified state is a state in which a user cannot alter a root key, an original equipment manufacturer keystore, a user keystore, or any combination thereof.

4. The device of claim 1, wherein the verified state is a state in which a user is allowed to overwrite or erase a cache, a partition containing user data, or any combination thereof.

5. The device of claim 1, wherein the keystore is a user-provided keystore.

6. The device of claim 1, further comprising:
 a display configured to display information;
 a user input interface configure to receive an input; and
 a bus coupled to computer-readable medium, the processor, the display, and the user input interface.

7. The device of claim 6, wherein the processor is configured to cause a prompt to be displayed on the display in response to a determination that the keystore fails to verify against the key.

8. The device of claim 7, wherein the keystore is a user-provided keystore and the key is a root key.

9. The device of claim 7, wherein the processor is configured to boot the device into a recovery mode in response to the input being an input to discontinue the boot process.

10. The device of claim 7, wherein the processor is configured to verify the boot image against the keystore in response to the input being an input to continue the boot process.

11. The device of claim 6, wherein the processor is configured to cause a prompt to be displayed on the display in response to a determination that the device is in an unlocked state.

12. The device of claim 11, wherein the unlocked state is a state in which verification of a boot loader is disabled.

13. The device of claim 11, wherein the processor is configured to boot the device into a recovery mode in response to the input being an input to discontinue the boot process.

14. The device of claim 11, wherein the processor is configured to finish the boot process is response to the input being an input to continue the boot process.

15. The device of claim 6, wherein the processor is configured to boot the device into a recovery mode in response to a determination that the boot image fails to verify against the keystore.

16. The device of claim 15, wherein the processor is configured to cause a warning to be displayed on the display in response to the determination that the boot image fails to verify against the keystore.

17. A computer-implemented method, comprising:
 determining, by a processor and in response to initiation of a boot process, that a device is in a locked state or a verified state;
 determining, by the processor, that a keystore fails to verify against a key;
 determining, by the processor and in response to a determination that the keystore fails to verify against the key, that a boot image verifies against the keystore; and
 finishing, by the processor, the boot process in response to a determination that the boot image verifies against the keystore.

18. The computer-implemented method of claim 17, further comprising:
 booting the device into a recovery mode in response to a determination that the boot image fails to verify against the keystore.

19. A non-transitory computer-readable medium storing computer code for controlling a processor, the computer code including instructions to:
- determine, in response to initiation of a boot process, that a device is in a locked state or a verified state;
- determine that a keystore fails to verify against a key;
- determine, in response to a determination that the keystore fails to verify against the key, that a boot image verifies against the keystore; and
- finish the boot process in response to a determination that the boot image verifies against the keystore.

20. The non-transitory computer-readable medium of claim 19, further comprising instructions to boot the device into a recovery mode in response to a determination that the boot image fails to verify against the keystore.

* * * * *